Patented Oct. 10, 1950

2,525,702

UNITED STATES PATENT OFFICE 2,525,702

PURIFICATION OF OIL

Morris Mattikow, New York, N. Y., assignor to Benjamin Clayton, doing business under the fictitious name and style of Refining, Unincorporated No Drawing. Application October 22, 1948, Serial No. 56,062

13 Claims. (Cl. 260—420)

This invention relates to the purification of oil, and more particularly, to an improved process of degumming crude glyceride oils in which a wetting or surface active agent is employed to assist in rendering the gums insoluble in the oil and to facilitate the separation of the gums from the oil.

Crude glyceride oils, such as animal and vegetable oils, usually contain a small amount of gums in solution. In most cases the gums are made up principally of phosphatides but they may contain proteinaceous material and other minor impurities including coloring matter. This is true whether the oil is originally obtained from the seeds or other vegetable or animal matter by a pressing operation with or without heat or by a solvent extraction process. The gums are removed from the oil in conventional alkali refining processes but in such cases they are separated as part of the soapstock which is a low grade material from which gums cannot be easily recovered. Also, the gums are largely destroyed in the refining process.

In recent years, large amounts of gums have been recovered as valuable by-products prior to alkali refining by degumming operations involving mixing a small amount of an aqueous degumming agent, usually water alone, with the oil to hydrate the gums so as to render them insoluble in the oil, followed by centrifugal separation of the hydrated gums from the oil. The gums themselves are emulsifying agents tending to form oil-in-water emulsions but by minimizing the amount of aqueous degumming agent, a relatively clean separation of the hydrated gums from the oil can be accomplished although a substantial amount of oil is emulsified in the separated phase. For example, the dried, separated gums will contain from 30 to 45% of oil. Since the aqueous agent employed is not miscible with the oil, intensive mixing is required in order to bring the aqueous reagent into contact with the gums dissolved in the oil.

When a small amount of a water-soluble surface active or wetting agent is incorporated into the aqueous degumming agent prior to admixture with the oil to be degummed, the aqueous agent is much more readily admixed with the oil. The time required for mixing is substantially shortened and an increased amount of the gums are hydrated so that a greater yield of gums and a purer oil is obtained upon separation of the aqueous phase from the oil. Even though the wetting agents useful in the present invention are also emulsifying agents tending to produce oil-in-water emulsions, the presence of such agents appears to cause the aqueous agent to be closely associated with the gums since the amount of oil emulsified into and separated with the aqueous phase is substantially decreased, thus reducing the loss of oil in the degumming operation.

The process of the present invention is particularly useful in treating solvent extracted oil. In solvent extraction processes, the crude oil is recovered in the form of a miscella which is a solution of the oil in a relatively large amount of oil solvent, for example, in from 4 to 10 volumes of commercial hexane, which is a petroleum fraction boiling in the hexane range. The prior art has considered it necessary to substantially completely remove the solvent from the oil prior to degumming or alkali refining operations on the oil. Difficulty has been experienced, however, in removing the last few percent of solvent, for example, the last 5 to 10%. The gums present in the miscella have caused excessive foaming during distillation of the solvent from the oil, and furthermore, the gums appear to tenaciously hold the solvent. A lengthy series of steam distillation stripping operations rendered difficult by the foaming referred to have therefore been required to remove residual solvent from the oil.

In my copending applications Serial No. 700,830, filed October 12, 1946 and Serial No. 713,927, filed December 4, 1946, I have disclosed that a degumming operation can be successfully carried out upon miscellas if the solvent content thereof is reduced to below approximately 25% by weight, for example, between 5 and 25% solvent. No difficulty is encountered in reducing the amount of solvent below 25% as the volatile solvent is easily vaporized from the oil. It is only the last few percent which is difficult to remove. Intensive mixing of an aqueous reagent into the oil-solvent mixture will produce hydration of the gums so as to render them insoluble in the oil and solvent. They can then be easily separated as part of an aqueous phase. However, if the solvent content is substantially above approximately 25%, the gums for the most part remain in solution in the oil-and-solvent mixture and cannot be separated from the oil. After removal of the gums as a result of a degumming operation upon an oil-solvent mixture containing less than about 25% solvent, the residual solvent is easily distilled from the mixture.

The presence of the solvent in the oil, however, renders it more difficult to admix the aqueous degumming agent into the oil. In many cases even extremely intensive mixing will not secure adequate contact between the gums and the aqueous degumming agent, with the result that a substantial portion of the gums are not rendered insoluble in the oil. Even though the correct amount of water is employed to hydrate all of the gums, a substantial portion of the aqueous degumming agent may not be utilized so that two aqueous phases, in addition to the oil-and-solvent phase, tend to form during separation of the aqueous material from the oil. These two aqueous phases are a lighter phase which is primarily hydrated gums and a heavier phase which is primarily water. The aqueous phase containing the gums lies between the water phase and the still lighter oil-and-solvent phase in a continuous centrifugal separator and tends to merge with the oil-and-solvent phase. It is frequently difficult if not impossible to adjust the operating conditions of the centrifugal separator to obtain a clean separation between the oil-and-solvent phase and the hydrated gums in addition to the fact that the oil-and-solvent phase may also contain a substantial amount of unhydrated gums in solution.

When a water-soluble surface active or wetting agent is added to the aqueous degumming agent, mixing between the degumming agent and the oil-and-solvent mixture rapidly takes place so that substantially all of the gums are rapidly hydrated and become insoluble in the oil-and-solvent mixture. Furthermore, the hydrated gums remain uniformly dispersed throughout the aqueous phase and there is a distinct separation between the single aqueous phase and the oil-and-solvent phase. Again, the amount of oil emulsified into the aqueous phase is lessened even though the useful surface active agents are emulsifying agents tending to form oil-in-water emulsions.

It is therefore an object of the invention to provide an improved process of degumming glyceride oils.

Another object of the invention is to provide an improved process of degumming glyceride oils which is particularly suitable for degumming solvent extracted glyceride oils prior to removing all of the solvent from the miscella resulting from the oil-extraction process.

Another object of the invention is to provide a process of degumming crude glyceride oils in which a wetting or surface active agent is employed to assist in hydrating the gums and for facilitating separation of the hydrated gums from the oil.

A further object of the invention is to provide a process of degumming solvent extracted oils in which the degumming is carried out while the oil still contains an oil solvent and a wetting or surface active agent is employed to assist in bringing an aqueous degumming agent into contact with the gums dissolved in the oil-and-solvent mixture.

As stated above, the present invention has particular utility in the degumming of solvent extracted oils in which case the oil is in solvent solution in a relatively large amount of solvent. A simple distillation process at relatively low temperatures and with or without a vacuum will serve to easily reduce the amount of solvent to below about 25% by weight although the presence of gums in such solvent extracted oil makes it extremely difficult to remove substantially all of the solvent. After the solvent has been reduced to approximately 25% or lower, an aqueous degumming agent will render the gums insoluble in the oil but the presence of the solvent renders it difficult to bring the aqueous degumming agent into contact with the gums dissolved in the oil. By adding to the aqueous degumming agent a wetting or surface active agent which is water-soluble and which tends to form an oil-in-water emulsion, the aqueous degumming agent readily admixes with the oil so as to contact the gums and hydrate the same, thus rendering them insoluble in the oil.

The nature of the wetting or surface active agents contemplated by the present invention are in general those known in the art as synthetic detergents, i. e., water-soluble organic non-soap synthetic detergents. Such synthetic detergents are broadly classified as being anionic, cationic or non-ionic. The anionic type are the best known and are in general preferred because of their availability and their excellent action in the present invention. The anionic, non-soap synthetic detergents are also frequently classified as being of the sulfated type or of the sulfonated type, i. e., they include either a sulfate group or a sulfonate group and an organic radical which may be either a long chain aliphatic group or may be an aromatic group or the anionic synthetic detergents may contain both alkyl and aryl groups. In many cases, such anionic non-soap synthetic detergents also contain ester groups or amido groups. They are frequently not a single compound but may be mixtures of various similar compounds. There are an extremely large number of available anionic wetting or surface active agents usable in the present invention and it is impracticable to attempt to list all of them. An example of a sulfated aliphatic synthetic detergent is sodium lauryl sulfate while an example of an aliphatic sulfonated detergent is dioctyl ester of sodium sulfosuccinic acid. An example of an aromatic sulfonate is decyl benzene sodium sulfonate. The aromatic sulfonates also containing an alkyl group are ordinarily mixtures of various compounds and are referred to in the art as alkylated aromatic sulfonates, alkyl aryl sulfonates, etc., and include such compounds as isopropyl naphthalene sodium sulfonate and sodium salts of alkylated aryl polyether sulfonates. An example of a cationic surface active agent usable in the present invention is alkyl dimethyl benzyl ammonium chloride, and an example of a non-ionic surface active agent usable in the present invention is an alkylated aryl polyether alcohol.

While ordinary alkali metal fatty acid soaps are broadly classified as anionic surface active agents, they are unsuitable for employment in the present invention. Although such soaps do assist in hydrating the gums and tend to produce a single aqueous phase, they cause an excessive amount of oil to be emulsified into the aqueous phase. The useful wetting agents are truly water-soluble and non-hydrolyzing and this property distinguishes them from soap which is not truly soluble in water but which forms a colloidal solution and also hydrolyzes in dilute solution. Furthermore, the water-insoluble, oil-soluble surface active agents, i. e., those surface active agents which tend to produce a water-in-oil type of emulsion, for example, those made up of organic compounds of calcium or other alkaline earth or heavy metals are also not suitable for employment in the present invention since they in general retard rather than aid in the hydration of the gums.

The amount and concentration of organic, water-soluble, non-soap type of wetting agent which is contemplated in the present invention vary considerably with the exact type of surface active agent employed. With most water-soluble wetting agents, a concentration as low as 0.1% of the agent in water may be sufficient, but in general, the concentration may range between 0.2% and 0.5%, although in many cases, the concentration may range from 0.1% to 2%. With most of the surface active agents contemplated, concentrations above 1%, for example, 2% to 20%, result in an increased loss of oil by emulsification of the oil into the aqueous phase. There are some exceptions to this, for example in the case of the sodium salt of alkylated aryl polyether sulfonate; increase in concentration of the wetting agent in an aqueous degumming agent up to approximately 33% gave decreasing losses of oil emulsified in the aqueous phase. This is also true of several of the cationic wetting agents and, in fact, some of the cationic wetting agents required a concentration of at least 10% for effective results. Since such surface active agents are usually quite expensive, the upper limit of concentration from economical considerations will ordinarily be around a 2% concentration although in the case of certain cationic wetting agents a 10% to 15% concentration may be economical for particular uses of the gums since such wetting agents, for example, alkyl dimethyl benzyl ammonium chloride, are also antiseptics preventing bacterial decomposition of the separated gums even though the separated gums are not dried but are stored in wet condition. All of the water-soluble, organic non-soap, synthetic detergent wetting agents are solid or liquid materials which are non-volatile.

As is well known in the art, prior degumming agents may be either water alone or solutions of electrolytes which do not deleteriously react with the oil. Thus, the degumming solution may be solutions of neutral salts or of weakly alkaline or weakly acidic salts with concentrations ranging from very dilute up to relatively concentrated solutions or may be very dilute solutions of strong acids or strong bases. The degumming agent may also contain lower aliphatic alcohols such as ethyl alcohol. Water alone is the usual degumming agent employed but the aqueous solutions referred to are operative. Additional emulsifying agents, such as the wetting agents of the present invention, have been avoided probably by reason of the fact that the gums themselves are excellent emulsifying agents tending to form oil-in-water emulsions and one of the problems of the art has been to reduce the oil emulsified into the separated aqueous phase to thus reduce the refining loss.

In general, the surface active agents contemplated in the present invention will be employed with water alone, although any of the wetting agents may be employed in conjunction with aqueous solutions of lower aliphatic alcohols or electrolytes which do not deleteriously react therewith. Thus, some of the wetting agents are weakly alkaline and would ordinarily not be employed with acidic aqueous degumming agents while others are weakly acidic in nature and would ordinarily not be employed with alkaline degumming agents. The amount of aqueous degumming agent contemplated by the present invention is substantially the same as that employed in the prior art and will depend upon the amount of gums contained in the oil. The usual range is between 1 and 3% based upon the weight of the crude oil although in some instances the amount may be as high as 5 or 10%.

In general, best results are obtained by continuously mixing a stream of the degumming agent with a stream of the oil and then immediately passing the combined stream into a centrifugal separator although the mixing may be in small batches so that separation can be effected immediately after the mixing operation. Gravity separation of the hydrated gums from the oil, for example, the settling and decanting operations, is generally not effective since the relatively long period of time required for the separation causes some of the hydrated gums to go back into solution in the oil. Small batches of the mixture can be separated in a batch type centrifugal but commercial operations will ordinarily employ continuous centrifugal separators. The temperature of mixing and centrifugal separation at room temperature or lower, for example from 10 to 25° C., although the process can be carried out at higher temperatures, for example, 35 to 55° C. In general, temperatures in the neighborhood of room temperature give the best results for both mixing and separation, although in some cases it is advantageous to mix at a lower temperature, then rapidly heat, preferably in stream flow, before delivering the mixture to the centrifugal separator.

The present invention is applicable to substantially all types of crude fatty oils including both animal and vegetable oils but is particularly applicable to vegetable oils and is also particularly applicable to the refining of solvent extracted oils still containing not more than about 25% solvent. Examples of vegetable oils which may be advantageously treated are soyabean, cottonseed, peanut, linseed, corn oils, etc., but the process is also applicable to the removal of gums including coloring matter from animal oils such as lard or tallow or fish oils, such as sardine or menhaden oil.

Commercial hexane, which is a mixture of petroleum fractions having a boiling point in the hexane range, is the solvent ordinarily employed for solvent extraction of oils and will therefore ordinarily be the solvent present in the oil-and-solvent mixture during the degumming operation. One example of a commercial hexane is a water-white material having a specific gravity of 74.4° A. P. T. at 60° F., a boiling range of 142 to 160° F., and a vapor pressure at 100° F. of 5.1 lbs. per square inch. Other oil solvents, for example, pure hexane, benzene, gasoline, petroleum ether, dichloroethylene, trichloroethylene, heptane, pentane, etc., may, however, be employed. In such processes, the system is preferably maintained closed to the atmosphere to avoid the loss of solvent and to guard against fire hazards when an inflammable solvent is employed.

As an example of the practice of the present invention, a crude soyabean miscella in which the commercial hexane solvent employed in extracting the oil had been reduced to 7.2% by weight by low temperature distillation was degummed with 2% of a solution of a commercial aryl-alkyl sulfonate (Nacconol NR) having a concentration of 0.1%. The degumming agent was admixed with the oil-and-solvent mixture at room temperature for a period of 3 minutes, after which the resulting mixture was subjected to centrifugal separation. A single homogenous aqueous phase containing the gums separated from the oil. The resulting oil had a phosphatide content of 0.1% whereas degumming another portion of the crude miscella with 2% water not containing the wetting agent under the same conditions resulted in an aqueous phase which separated into two layers and the separated oil had a phosphatide content of 0.468%. When employing a wetting agent as above described, the refining loss, i. e., the total loss in weight of the oil was approximately one-half of the refining loss when water alone was employed even though a greater amount of the gums was separated from the oil when the wetting agent was employed. That is to say, much less oil was emulsified into the aqueous phase when the wetting agent was employed.

From the above discussion of the invention, it should be apparent that the present invention has major utility in the purification of solvent extracted oils. The employment of the wetting agent enables the aqueous degumming agent to be easily brought into intimate contact with the gums dissolved in the oil even in the presence of a solvent. This enables an efficient process to be carried out when the gums are removed from the oil before all of the solvent is removed therefrom. This in turn avoids the difficulties encountered when it is attempted to remove the last traces of solvent from a crude oil miscella containing gums. In addition, a lighter colored degummed crude oil is obtained than is the case when all of the solvent is removed before the oil is degummed. One reason for this is that the removal of the gums allows the last trace of solvent to be distilled from the oil in less time and at a lower temperature so that color is not "set" in the oil by the high temperatures necessary when the solvent is removed in the presence of gums.

Lighter gums after purification are also produced since they have not been subjected to the high temperatures necessary to remove the solvent in the presence of the gums. Furthermore, the separated gums in a degumming operation upon a solvent-and-oil mixture are substantially free from solvent, so that further treatment of the gums to remove solvent is unnecessary. Also, the resulting crude oil is of better quality since the removal of the last traces of solvent is in effect a deodorizing operation which is much more efficient in the absence of gums. Also, the gums themselves are of higher quality since a considerable quantity of impurities known as unsaponifiables remain in the solution in the oil-and-solvent mixture and are not separated with the gums as is the case when the solvent is removed from the crude oil prior to degumming. However, the present process is also applicable to crude oils which contain no solvent, such as pressed oils, and has the advantage that the degumming operation may be more rapidly performed and the refining loss is considerably reduced by minimizing the amount of oil emulsified into the separated aqueous phase containing the gums. In either case, the wetting agent is removed from the oil with the gums and the presence of such agent in the gums is a decided advantage. The gums, particularly those from vegetable oils, constitute a valuable by-product having many uses known to the art. They are ordinarily dried to remove substantially all of the contained water before they are marketed or stored in order to prevent bacterial growth in the wet gums. However, the majority of uses of the gums involve the re-dispersion of the gums in an aqueous material. The presence of the wetting agent renders the gums much more easily dispersible in water.

I claim:

1. The process of degumming crude glyceride oils, which comprises, admixing with said oil an aqueous degumming agent containing in solution a non-volatile, water-soluble, organic non-soap synthetic detergent as a wetting agent to hydrate the gums contained in said oil and render them insoluble in said oil, and thereafter centrifugally separating an aqueous phase containing the hydrated gums from said oil.

2. The process of degumming a solvent-extracted crude glyceride oil, which comprises, admixing with said oil, while said oil contains between approximately 5 to 25% by weight of said solvent, an aqueous degumming agent containing in solution a non-volatile, water-soluble, organic, non-soap synthetic detergent as a wetting agent to hydrate the gums contained in said oil and render them insoluble in the oil and solvent, and thereafter centrifugally separating an aqueous phase containing the hydrated gums from said oil.

3. The process of degumming crude glyceride oils, which comprises, admixing with said oil an aqueous degumming agent containing in solution a non-volatile, water-soluble, organic, non-soap synthetic detergent as a wetting agent to hydrate the gums contained in said oil and render them insoluble in said oil, the concentration of said wetting agent in said degumming agent being between approximately 0.1 and 15% by weight and the amount of said degumming agent being between approximately 1 and 10% of the weight of said oil, and thereafter centrifugally separating an aqueous phase containing the hydrated gums from said oil.

4. The process of degumming crude glyceride oils, which comprises, admixing with said oil an aqueous degumming agent containing in solution a non-volatile, water-soluble, organic, non-soap anionic synthetic detergent as a wetting agent to hydrate the gums contained in said oil and render them insoluble in said oil, and thereafter centrifugally separating an aqueous phase containing the hydrated gums from said oil.

5. The process of degumming crude glyceride oils, which comprises, admixing with said oil an aqueous degumming agent containing in solution a non-volatile, water-soluble, organic, non-soap, anionic synthetic detergent wetting agent to hydrate the gums contained in said oil and render them insoluble in said oil, the concentration of said wetting agent in said degumming agent being between approximately 0.1 and 2% by weight and the amount of said degumming agent being between approximately 1 and 10% of the weight of said oil, and thereafter centrifugally separating an aqueous phase containing the hydrated gums from said oil.

6. The process of degumming crude glyceride oils, which comprises, admixing with said oil an aqueous degumming agent containing in solution a non-volatile, water-soluble, organic, non-soap, cationic synthetic detergent as a wetting agent to hydrate the gums contained in said oil and render them insoluble in said oil, and thereafter centrifugally separating an aqueous phase containing the hydrated gums from said oil.

7. The process of degumming crude glyceride oils, which comprises, admixing with said oil an aqueous degumming agent containing in solution a non-volatile, water-soluble, organic, non-soap, cationic synthetic detergent as a wetting agent to hydrate the gums contained in said oil and render them insoluble in said oil, the concentration of said wetting agent in said degumming agent being between approximately 0.1 and 15% by weight and the amount of said degumming agent being between approximately 1 and 10% of the weight of said oil, and thereafter centrifugally separating an aqueous phase containing the hydrated gums from said oil.

8. The process of degumming a solvent-extracted crude glyceride oil, which comprises, admixing with said oil, while said oil contains between approximately 5 to 25% by weight of said solvent, an aqueous degumming agent containing in solution a non-volatile water-soluble, organic, non-soap, anionic synthetic detergent as a wetting agent to hydrate the gums contained in said oil and render them insoluble in the oil and solvent, and thereafter centrifugally separating an aqueous phase containing the hydrated gums from said oil.

9. The process of degumming a solvent-extracted crude glyceride oil, which comprises, admixing with said oil, while said oil contains between approximately 5 to 25% by weight of said solvent, an aqueous degumming agent containing in solution a non-volatile water-soluble, organic, non-soap synthetic detergent as a wetting agent to hydrate the gums contained in said oil and render them insoluble in the oil and solvent, the concentration of said wetting agent in said degumming agent being between approximately 0.1 and 15% by weight and the amount of said degumming agent being between approximately 1 and 10% of the weight of said oil, and thereafter centrifugally separating an aqueous phase containing the hydrated gums from said oil.

10. The process of degumming a solvent-extracted crude glyceride oil, which comprises, admixing with said oil, while said oil contains between approximately 5 to 25% by weight of said solvent, an aqueous degumming agent containing in solution a non-volatile water-soluble, organic, non-soap, anionic synthetic detergent as a wetting agent to hydrate the gums contained in said oil and render them insoluble in the oil and solvent, the concentration of said wetting agent in said degumming agent being between approximately 0.1 and 2% by weight and the amount of said degumming agent being between approximately 1 and 10% of the weight of said oil, and thereafter centrifugally separating an aqueous phase containing the hydrated gums from said oil.

11. The process of degumming a solvent-extracted crude glyceride oil, which comprises, admixing with said oil, while said oil contains between approximately 5 to 25% by weight of said solvent, an aqueous degumming agent containing in solution a non-volatile water-soluble, organic, non-soap, cationic synthetic detergent as a wetting agent to hydrate the gums contained in said oil and render them insoluble in the oil and solvent, the concentration of said wetting agent in said degumming agent being between approximately 0.1 and 15% by weight and the amount of said degumming agent being between approximately 1 and 10% of the weight of said oil, and thereafter centrifugally separating an aqueous phase containing the hydrated gums from said oil.

12. The process of degumming a solvent-extracted crude glyceride oil, which comprises, admixing with said oil, while said oil contains between approximately 5 to 25% by weight of said solvent, an aqueous degumming agent containing in solution an aryl alkyl sulfonate as a wetting agent to hydrate the gums contained in said oil and render them insoluble in the oil and solvent, and thereafter centrifugally separating an aqueous phase containing the hydrated gums from said oil.

13. The process of degumming a solvent-extracted crude glyceride oil, which comprises, admixing with said oil, while said oil contains between approximately 5 to 25% by weight of said solvent, an aqueous degumming agent containing in solution an aryl alkyl sulfonate as a wetting agent to hydrate the gums contained in said oil and render them insoluble in the oil and solvent, the concentration of said wetting agent in said degumming agent being between approximately 0.1 and 2% by weight and the amount of said degumming agent being between approximately 1 and 10% of the weight of said oil, and thereafter centrifugally separating an aqueous phase containing the hydrated gums from said oil.

MORRIS MATTIKOW.

REFERENCES CITED

The following references are of record in the file of this patent:

UNITED STATES PATENTS

| Number | Name | Date |
|---|---|---|
| 2,205,971 | Clayton et al. | June 25, 1940 |
| 2,260,731 | Thurman | Oct. 28, 1941 |
| 2,288,441 | Ewing | June 30, 1942 |